United States Patent Office.

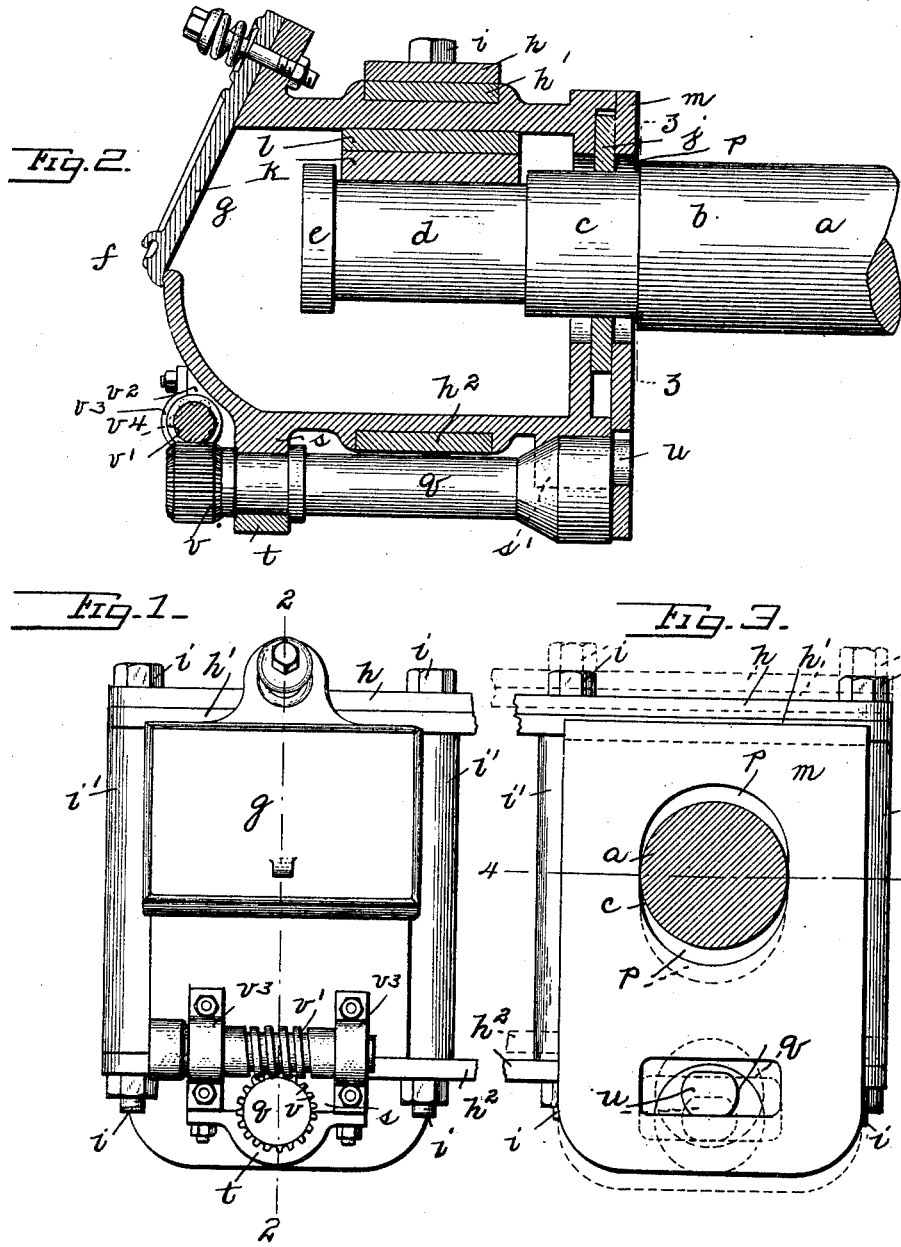

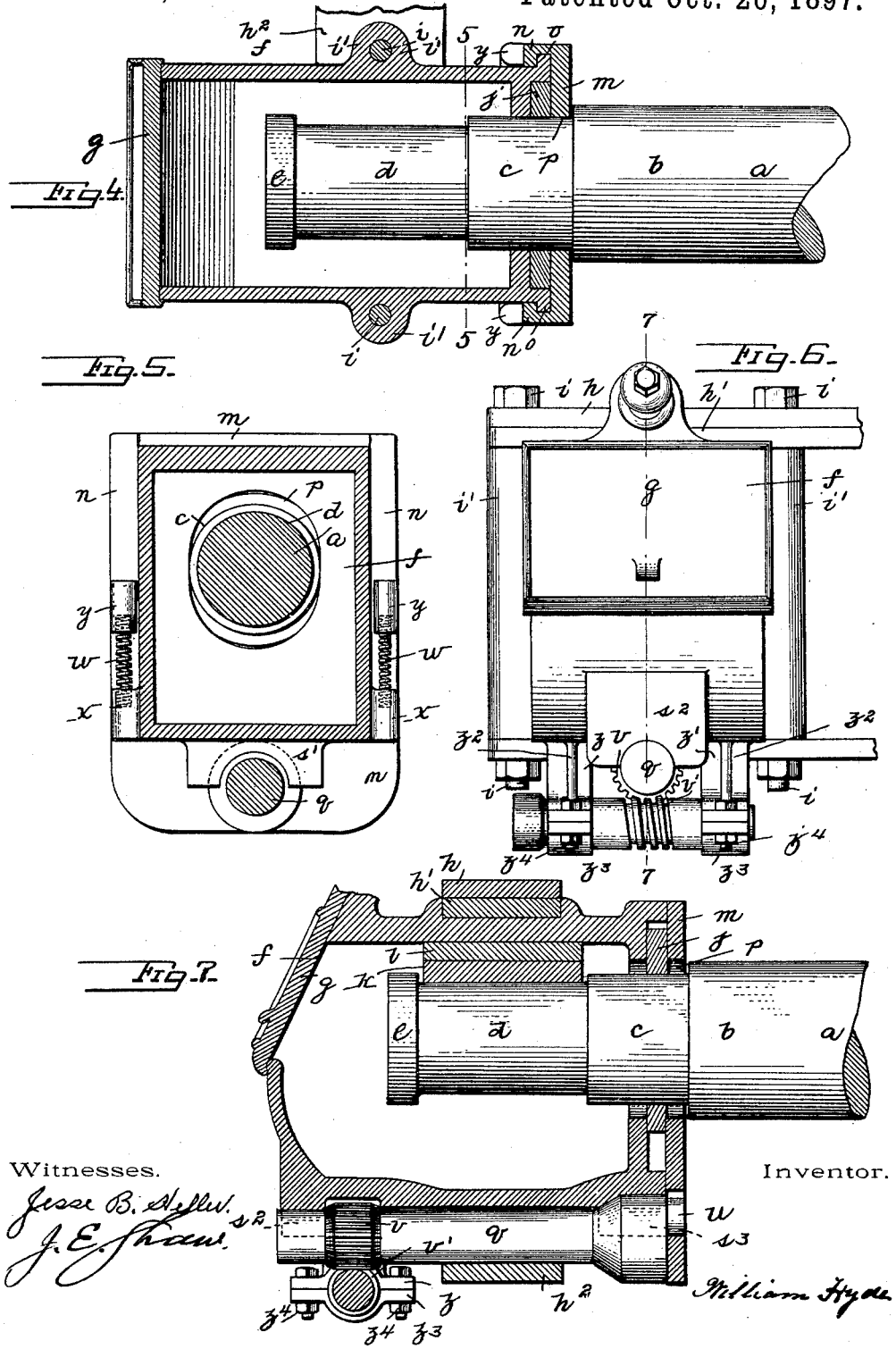

WILLIAM HYDE, OF PHILADELPHIA, PENNSYLVANIA.

AXLE-BOX.

SPECIFICATION forming part of Letters Patent No. 592,520, dated October 26, 1897.

Application filed February 20, 1897. Serial No. 624,479. (No model.)

*To all whom it may concern:*

Be it known that I, WILLIAM HYDE, a citizen of the United States, residing in the city of Philadelphia, State of Pennsylvania, have invented a new and useful Improvement in Axle-Boxes, of which invention the following is a specification.

This invention relates to the axle-box described in Patents No. 520,314, dated May 22, 1894, and No. 534,369, dated February 19, 1895; and it consists of an improvement in the "springs" (described in said patents) for holding the "link" in close contact with the "cam" and also for holding said link clear of the "axle" when the link is not in use for lifting.

In the annexed drawings, Figure 1 is a front elevation of the axle-box; Fig. 2, a sectional elevation of the box and axle on line 2 2 of Fig. 1; Fig. 3, a sectional elevation of the same on line 3 3 of Fig. 2; Fig. 4, a sectional plan of the same on line 4 4 of Fig. 3; Fig. 5, a sectional elevation of the same on line 5 5 of Fig. 4. Fig. 6 is a front elevation of the box, showing a modified arrangement of the worm and also modified details of the box; and Fig. 7, a section on line 7 7 of Fig. 6.

Similar letters of reference denote similar parts in the several views.

Referring to Fig. 2, $a$ represents the car-axle, whereof $b$ is the wheel-seat; $c$, the dust-guard bearing; $d$, the journal; $e$, the collar; $f$, the axle-box; $g$, the lid; $h$, a portion of the arch-bar; $h'$, a portion of the inverted arch-bar; $h^2$, a portion of the tie-bar; $i$, bolts and nuts for securing the axle-box between said bars, the bolts $i$ passing through tubular projections $i'$ (see Fig. 4) cast with the box; $j$, the dust-guard; $k$, the journal-bearing; $l$, the key; $m$, the link, provided with lugs $n$, which engage corresponding lugs $o$ of the axle-box, (see Fig. 4;) $p$, an aperture in link $m$ for the axle, said aperture being made large enough to admit of the necessary movement of the link up and down as required and also to admit of the link being held clear of the axle, as shown in Fig. 3, when not in use.

$q$ represents the spindle working between bearings $s$ and $s'$, which project from the bottom of the axle-box. The spindle $q$ is supported at or near its front end by a cap $t$ (see Figs. 1 and 2) and at its rear end by springs $w$, hereinafter described. The spindle $q$ carries cam $u$ at its rear end and is provided at its opposite end with spiral gear $v$, which engages the worm or screw $v'$.

$v^2$, Fig. 2, represents lugs or brackets cast on the front of the axle-box, the worm or screw $v'$ being supported by these lugs by caps $v^3$ with bolts and nuts, as shown.

A recess is formed in one end or in both ends of the worm or screw $v'$, the same being adapted to receive the head of a crank or lever, said recesses preferably having the five-angled form indicated by dotted lines $v^4$ in Fig. 2. For turning the worm or screw $v'$, I prefer to use an ordinary ratchet-lever provided with a head or tongue adapted to fit said five-angled recess.

Instead of the springs described in said patents as means for holding link $m$ in contact with cam $u$ and also for holding the link up clear of the axle when the link is not in use for lifting I employ the spiral springs $w$, (see Fig. 5,) which are supported loosely in the recessed lugs $x$ and $y$, lugs $x$ being cast or otherwise formed on the outside of the axle-box and lugs $y$ on the link, as shown. Thus located, these springs can be given any size and strength required by the work intended to be done by them, and they are made more certain in their action on the link. They are rendered easy of access, and they at the same time form sufficient support for the rear end of the spindle.

Although I prefer to arrange the worm or screw for operating spindle $q$ above the spindle, as shown in Figs. 1 and 2, said worm or screw may be placed below the spindle, as shown in Figs. 6 and 7. In this case the axle-box is provided with the bearings $s^2$ and $s^3$ for the spindle $q$ and with brackets $z$ and $z'$, preferably strengthened with ribs $z^2$, the spindle being conveniently supported by the tie-bar $h^2$, which is bent for this purpose, as described in said Patent No. 520,314, and by the worm or screw $v'$, which in turn is supported by caps $z^3$, which are secured by the bolts and nuts $z^4$, as shown in Figs. 6 and 7.

In my said Patent No. 534,369 I describe the application to the spindle of a ratchet and pawl for holding the axle-box and its load at any height while lifting. By providing the spindle with the spiral gear and employing the worm as above described I am enabled to hold the box and its load securely both while lifting and lowering them.

I claim—

1. In combination with the axle of a railroad-car, an axle-box provided with a link capable of downward and upward movements, a spindle adapted to be rotated; a cam arranged on said spindle in engagement with said link and adapted to move said link down to bear on said axle, or to move it up to be clear of said axle, as required; spiral springs $w$ located outside said axle-box; sockets $x$ attached to said link; and sockets $y$ attached to said axle-box, substantially as and for the purpose set forth.

2. In combination with the axle of a railroad-car, an axle-box provided with a link capable of downward and upward movements; a spindle adapted to be rotated; a cam arranged on said spindle, in engagement with said link and adapted to move said link down to bear on said axle, or to move it up to be clear of said axle, as required; springs located outside said axle-box and means for holding said springs at one point of the latter, in engagement with said link, and at another point in engagement with said axle-box, substantially as and for the purpose set forth.

WILLIAM HYDE.

Witnesses:
J. E. SHAW,
JOS. B. WILLITS.